United States Patent
Damrath

(10) Patent No.: US 7,200,511 B2
(45) Date of Patent: Apr. 3, 2007

(54) METHOD AND DEVICE FOR IDENTIFYING AN OBJECT

(75) Inventor: Joachim Damrath, Bachhagel (DE)

(73) Assignee: BSH Bosch und Siemens Hausgeräte GmbH, München (DE)

( * ) Notice: Subject to any disclaimer, the term of this patent is extended or adjusted under 35 U.S.C. 154(b) by 118 days.

(21) Appl. No.: 10/847,496

(22) Filed: May 17, 2004

(65) Prior Publication Data

US 2004/0249843 A1   Dec. 9, 2004

Related U.S. Application Data

(63) Continuation of application No. PCT/EP02/12218, filed on Oct. 31, 2002.

(30) Foreign Application Priority Data

Nov. 15, 2001   (DE) ................. 101 56 157

(51) Int. Cl.
*G01D 1/00* (2006.01)
(52) U.S. Cl. .................. 702/127; 705/17
(58) Field of Classification Search ............... 702/127; 705/17; 235/385; 177/245
See application file for complete search history.

(56) References Cited

U.S. PATENT DOCUMENTS 5,497,314 A * 3/1996 Novak ................... 705/17
5,691,684 A * 11/1997 Murrah .................. 235/385
6,204,763 B1   3/2001 Sone ..................... 340/568.1

FOREIGN PATENT DOCUMENTS

| EP | 0 685 814 A2 | 12/1995 |
|---|---|---|
| EP | 1 030 521 A1 | 8/2000 |

* cited by examiner

Primary Examiner—Michael Nghiem
Assistant Examiner—Xiuqin Sun
(74) Attorney, Agent, or Firm—Laurence A. Greenberg; Werner H. Stemer; Ralph E. Locher

(57) ABSTRACT

A method and a device for identifying an object among several possible objects permits an object to be automatically identified among several possible objects and can be used, for example, in household appliances. The invention improves automatic identification of these objects so that the objects can be reliably recognized without error by identifying the inherent properties of the objects such that additional identification marks can be avoided. Depending upon the number and type of the objects that are to be distinguished, the method includes determining at least a sufficient amount of measured values for measuring different physical properties so that the object is identified based upon at least one physical property thereof.

31 Claims, 2 Drawing Sheets

| Sensor type | Measured value for apple | Measured value for Brussels sprouts | Feature difference |
|---|---|---|---|
| Temperature | 8°C | 8°C | nonspecific |
| Weight | 50 grams | 80 grams | nonspecific |
| Water content (e.g. IR spectroscopy) | 80% | 50% | yes |
| Color (photodiode with color filter) | green | green | nonspecific |
| Shape (CCD camera) | round, diameter 6 cm | round, diameter 2 cm | yes |
| Transmitted light (IR image evaluation) | 0.5 mm sheath, uniform structure, central turbidity | No sheath, nonuniform structure, rough | yes |
| Vibration impulse response (vibro-tactile sensor) | 80% hard | 30% hard | yes |
| Gas detector (sensor array) | Apple-specific aerosols | Brussels sprouts-specific aerosols | yes |
| Electrical conductivity | high | medium | yes |
| Filling level (ultrasound) | none | none | no |
| Magnetic sensor | none | none | no |
| Thermal conductivity | 5 W/mK | 2 W/mK | yes |

| Sensor type | Measured value for apple | Measured value for Brussels sprouts | Feature difference |
|---|---|---|---|
| Temperature | 8°C | 8°C | nonspecific |
| Weight | 50 grams | 80 grams | nonspecific |
| Water content (e.g. IR spectroscopy) | 80% | 50% | yes |
| Color (photodiode with color filter) | green | green | nonspecific |
| Shape (CCD camera) | round, diameter 6 cm | round, diameter 2 cm | yes |
| Transmitted light (IR image evaluation) | 0.5 mm sheath, uniform structure, central turbidity | No sheath, nonuniform structure, rough | yes |
| Vibration impulse response (vibro-tactile sensor) | 80% hard | 30% hard | yes |
| Gas detector (sensor array) | Apple-specific aerosols | Brussels sprouts-specific aerosols | yes |
| Electrical conductivity | high | medium | yes |
| Filling level (ultrasound) | none | none | no |
| Magnetic sensor | none | none | no |
| Thermal conductivity | 5 W/mK | 2 W/mK | yes |

Fig. 1

METHOD AND DEVICE FOR IDENTIFYING AN OBJECT

CROSS-REFERENCE TO RELATED APPLICATION

This application is a continuation of copending International Application No. PCT/EP02/12218, filed Oct. 31, 2002, which designated the United States and was not published in English.

BACKGROUND OF THE INVENTION

Field of the Invention

The invention relates to a method and a device for identifying at least one object from a number of possible objects by evaluating measured values that are obtained from measured value pick-ups. The method can be used, for example, in household appliances.

European Patent Application 1 030 521 A1 discloses a method of detecting the content of a cupboard, in which a camera disposed in the interior of the cupboard registers the content optically and provides the image data to an electronic computer that, in turn, evaluates the image data and displays the content in the form of a list.

From the further state of the art, U.S. Pat. No. 5,691,684 to Murrah discloses a method of detecting objects in a refrigerator that detects the objects based upon a marking. The detection is carried out by optical scanning of a bar code.

U.S. Pat. No. 6,204,763 to Sone discloses a method of filling a household larder that can detect the presence or the absence of goods or the state of use of an object based upon the weight. The method in Sone is used for determining the filling level of the larder, it is not possible for individual objects to be detected directly by the sensors, merely information about the presence of goods already identified per se is attainable.

SUMMARY OF THE INVENTION

It is accordingly an object of the invention to provide a method and device for identifying an object that overcome the hereinafore-mentioned disadvantages of the heretofore-known devices and methods of this general type and by which an object from a number of possible objects can be identified automatically.

With the foregoing and other objects in view, there is provided, in accordance with the invention, a method for identifying at least one object from a number of possible objects, including the steps of obtaining measured values of different physical properties of objects with at least one measurement device and, dependent upon a number and a type of the objects to be distinguished, evaluating the measured values obtained by determining at least a minimum number of the measured values of the objects to allow identification of at least one of the objects based upon at least one of the physical properties.

It is a further object of the invention to improve the automatic identification of objects such that reliable and error-free detection becomes possible. It is also an object of the invention to be able to identify the objects by their inherent characteristics, it being possible to dispense with additional detection marks.

According to the invention, for the purpose of achievement, a method is proposed in which, depending on the number and type of objects to be distinguished, at least a sufficient number of measured values for measuring different physical properties of the objects are determined so that the at least one object is identified based upon at least one physical property.

For each object to be identified, an associated signal profile is generated from a large number of measured values. In such a case, the signal profiles can be stored in a signal profile memory. For instance, an electronic database can be used as a signal profile memory. The database can be driven by an electronic computer.

In accordance with another mode of the invention, a specific signal profile is generated from a number of measured values for each object to be identified.

In accordance with a further mode of the invention, the signal profiles are stored in a signal profile memory.

In accordance with an added mode of the invention, the signal profile memory is an electronic database.

In accordance with an additional mode of the invention, a respective signal profile is associated with a specific possible object based upon an input variable.

In accordance with yet another feature of the invention, a number of signal profile memories are linked with one another and an assignment of a signal profile to a possible object is carried out in one of the signal profile memories.

In accordance with yet a further feature of the invention, at least one of the optical sensors as an image-evaluating camera system.

The measured value pick-ups used can be sensors that, for example, determine the physical properties of the objects. For such a purpose, for example, the temperature, the weight, the humidity, the electrical conductivity, the thermal conductivity, the electrical capacitance, the magnetism, the radioactivity, or the discharge of gas from the objects can be determined by respectively suitable sensors.

In such a case, the sensors, preferably, determine the physical properties by direct measurement. However, the physical properties of the objects can also be determined indirectly, for example, through ultrasound vibration analysis or infrared spectroscopy.

As an additional aid, use can be made of optical sensors that determine the color, the shape, or the surface structure of the objects. In all of the variants, it is particularly beneficial if the sensors measure the properties of the objects without contact. A non-contact measurement can, in such a case, be carried out through video cameras, for example, which record and evaluate images of the objects. The video cameras can also be used in the transmitted light technique.

In exceptional cases, in which a distinction between two different objects cannot be made solely on account of the physical properties, that is to say, the signal profiles for the two different objects are identical, the system can apply a marking to the object, such as a bar code, a text label, or a transponder chip. To utilize this function, an appropriate sensor is, then, necessary, for example, a bar code reader, a text reader, or a transponder reader.

Based upon physical measured values that have already been determined, it is also possible to calculate further physical data, which can then be incorporated in the signal profile as additional values. In addition, it is also possible, for example, based upon the water content determined by non-contact IR spectroscopy and the electrical conductivity, measured with contact, to draw conclusions about the components, such as the sugar or salt content.

The method according to the invention can be used, in particular, in household appliances. In such appliances, it is possible to use a control system that operates in accordance with the method of the invention. Here, provision can be made for objects in the household appliance to be detected and indicated. However, a further application is for functions of the household appliances to be controlled automatically based upon the objects present and identified.

In accordance with yet an added feature of the invention, the physical properties determined by the sensors are used as an input variable for determining further physical variables that can be determined from the input variables.

With the objects of the invention in view, there is also provided a device for identifying at least one object from a number of possible objects, including at least one measurement device for obtaining measured values of different physical properties of the objects to be measured and an evaluation assembly connected to the measurement device, the evaluation assembly being programmed to receive the measured values from the measurement device and evaluate the measured values obtained, dependent upon a number and a type of the objects to be distinguished, by determining at least a minimum number of the measured values of the objects to allow identification of at least one of the objects based upon at least one of the physical properties.

With the objects of the invention in view, in an electrical household appliance, there is also provided an evaluator including a device for identifying at least one object from a number of possible objects having at least one measurement device for obtaining measured values of different physical properties of the objects to be measured, and an evaluation assembly connected to the measurement device, the assembly being programmed to receive the measured values from the measurement device and evaluate the measured values obtained, dependent upon a number and a type of the objects to be distinguished, by determining at least a minimum number of the measured values of the objects to allow identification of at least one of the objects based upon at least one of the physical properties.

In accordance with yet an additional feature of the invention, the evaluation assembly supplies at least one output signal for driving electrical appliances and the output signal drives at least one operating function of at least one electrical household appliance selected from a stove, a cooktop, an extractor hood, a dishwasher, a refrigerator, a freezer, a washing machine, a clothes dryer, a household robot, a floor cleaning appliance, and a vacuum cleaner.

In refrigerators or freezers, the presence of specific objects can be detected automatically and, for example, a shopping list can be generated, or the user can have his or her attention drawn to the lack of specific objects by optical or acoustic signals, or it can be pointed out that the quantity of a specific object will soon be used up or is coming to an end. The object can be a bottle of milk, which is used up gradually by the user, it being pointed out that the milk will soon be used up when a minimum quantity in the bottle is reached.

In dishwashers, the information about the objects present can be used to define the washing period or to apply a specific detergent. For example, depending on the number of glasses or plates and their relation to one another, a different detergent can be used or the amount of detergent can be changed. A further function of the dishwasher that can be controlled based upon the objects identified is the water temperature.

The same is true in a corresponding manner of washing machines, it being possible for the type of detergent, the amount of detergent, the water temperature, and the spinning speed to be predetermined based upon the items of clothing identified by the sensors and to be washed. In clothes dryers, the drying temperature, the drying period, and the drum speed can, preferably, be controlled based upon the items of clothing identified.

In cooking appliances, such as a stove, oven, cooktops, hobs, or extractor hoods, the respective foodstuff can be identified as an object and the functions of the cooking appliances can be driven in suitable way. For example, depending on the material to be cooked in the oven of a cooker, the type of cooking, the cooking period, or the cooking temperature can be controlled.

In accordance with again another feature of the invention, a location of a measurement is included in the signal profile.

Recording the feature of the location of the measurement in the signal profile can be important, for example, for cooking in stoves. Thus, an individual cooking temperature is given by the location at which the cooking process is carried out. The cooking temperature can, however, also be used to control the processes in washing machines or dishwashers.

In accordance with again a further feature of the invention, provision is made to link a number of household appliances or the signal profile memories of a number of household appliances with one another to be able to interchange entire signal profiles or individual items of data from the various signal profile memories. Here, the information from the signal profile memory of one household appliance can also be used for controlling the other household appliance. For example, the removal of a specific foodstuff from the refrigerator can be detected and passed on as an item of information to the cooking appliance to start preheating the cooking appliance in particular to the necessary cooking temperature.

In accordance with again an added feature of the invention, provision can also be made to link the signal profile memories of household appliances from different households with one another. For example, the signal profile for a specific object in the refrigerator of one household can be copied to the refrigerator of another household. Thus, a signal profile for a specific object or food product already present in one household can be made available to a further household. In such a case, one refrigerator learns the identification of the object or food product from another refrigerator.

In accordance with a concomitant feature of the invention, the signal profiles are generated by evaluating appropriate series of measurements and by entering the associated product designations, as well as further properties such as processing advice and other data, and combined and stored in a signal profile memory. New signal profiles can be predefined directly in the signal profile memory by the provider of the household appliances, or the user can create and store his/her own signal profiles. The signal profiles generated by the individual users can be made available to other users.

The set of all available signal profiles can also be registered in a central signal profile memory and be transmitted as required to all connected household appliances in the households. Transmitting the signal profiles can be carried out, for example, in the form of an electronic data set through a data communications line and a suitable communications system, such as the Internet.

Apart from the pure identification of the objects, a system according to the invention is also able to register the current state of objects. For example, the state of freshness of a foodstuff in a refrigerator can be monitored and degradation of the foodstuff can be indicated optically or acoustically.

Other features that are considered as characteristic for the invention are set forth in the appended claims.

Although the invention is illustrated and described herein as embodied in a method and device for identifying an object, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 1 is a list of a possible signal profile for the foodstuffs apple and Brussels sprouts.

DESCRIPTION OF THE PREFERRED EMBODIMENTS

Figure 2:
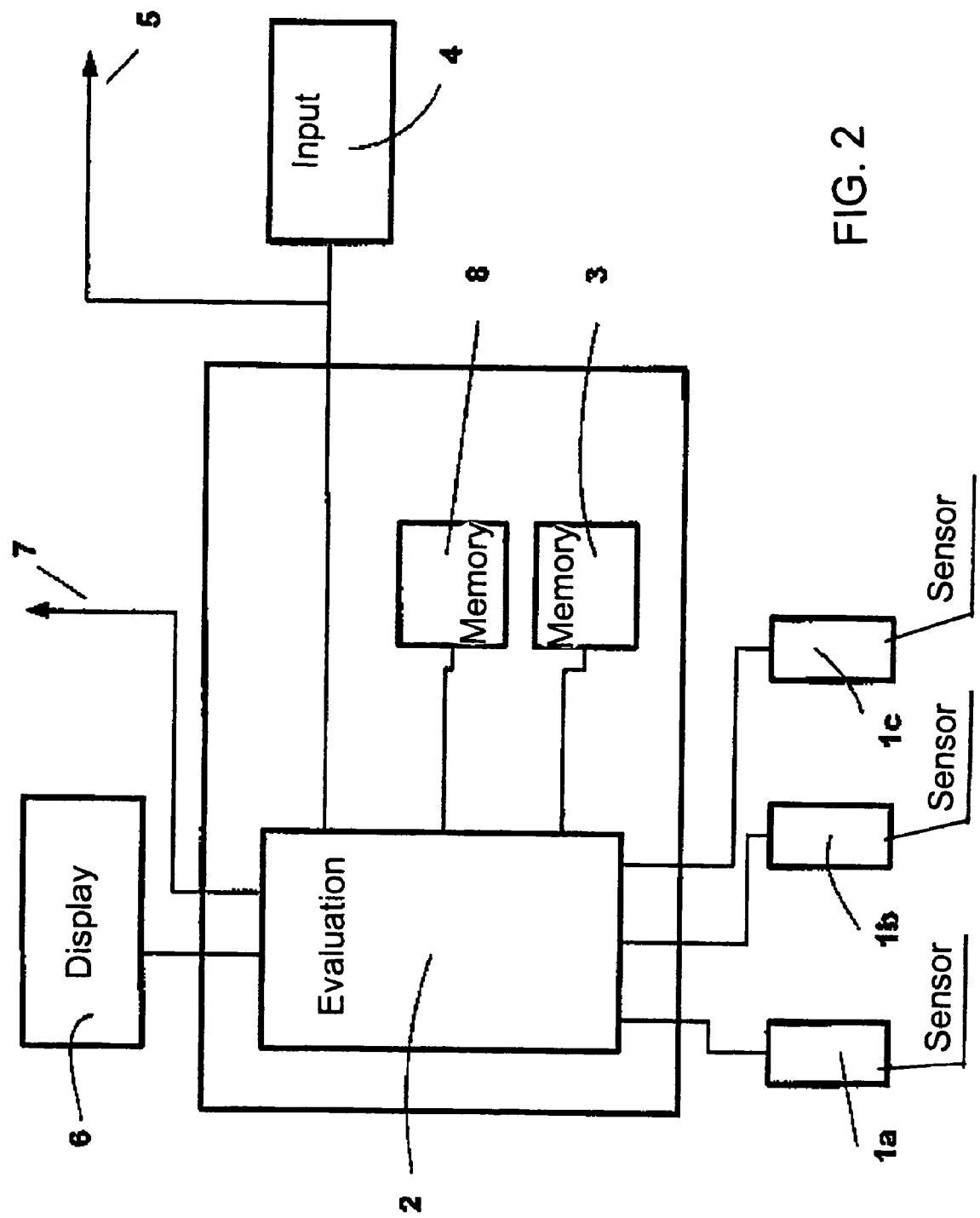
FIG. 2 is a block circuit diagram of a device carrying out the method according to the invention.

The invention is explained in more detail in the following application example.

Referring now to the figures of the drawings in detail and first, particularly to FIG. 1 thereof, there are shown objects (apple and Brussels sprouts) that are to be identified in a refrigerator. For such a purpose, it is necessary for at least a sufficient number of measured values to be determined so that an unambiguous decision is possible, at least based upon one measured value type. For such a purpose, various sensor types are used and the measured values for apple and Brussels sprouts is determined.

The measured temperature is identical because both objects are subjected to the same ambient conditions in the refrigerator.

In addition, a difference in the temperature on its own would not permit any conclusions about an apple or Brussels sprouts.

Nor does the weight on its own permit any unambiguous differentiation because these are natural products that can exhibit considerable fluctuations in weight and the weights measured in the example are only slightly different.

The water content can be used as a distinguishing feature because the difference between the two measured water contents (80% in the case of an apple and 50% in the case of Brussels sprouts) is large and the water content is, typically, very high in apples and substantially lower in Brussels sprouts.

The color does not represent any specific distinguishing feature because specific types of apple have a green color and Brussels sprouts are always green. The shape is round for both objects and, thus, not a distinguishing feature. However, a distinction is possible if the diameter is also registered and measured. Apples always have a substantially greater diameter than Brussels sprouts.

In the case of transmitted light image evaluation with infrared light, the result for an apple is a thin sheath of about 0.5 mm thickness, a uniform structure in the interior, and the core appears turbid at the center. As opposed thereto, in the case of Brussels sprouts, no sheath appears and the internal structure is non-uniform and rough (layers of leaves). Image evaluation, therefore, supplies good distinguishability for apples and Brussels sprouts.

A similarly good distinguishing power is supplied by vibro-tactile sensing technology, which determines the solidity of the object. In such a case, the result for the apple is an 80% hardness and for Brussels sprouts a considerably lower hardness results, only 30%.

Important distinguishing power can also be permitted by gas detection, which picks up and evaluates gases or aerosols originating from the objects. Depending on the aerosol or aerosol spectrum, the apple can be distinguished clearly from Brussels sprouts.

Measurement of the filling level by ultrasound sensors or the determination of magnetism by magnetic sensors does not supply any values and is, therefore, unsuitable for distinguishing apples and Brussels sprouts.

On the other hand, the measurement of the electrical conductivity and the thermal conductivity is possible to produce an additional distinguishing feature.

A device for carrying out the method according to the invention is indicated in FIG. 2. The objects to be identified, here, apples and Brussels sprouts, are scanned by the sensors $1a$, $1b$, and $1c$. Each of the sensors $1a$, $1b$, $1c$ picks up a sensor-specific physical measured value for each object. The measured values are supplied to an evaluation unit 2, in which the measured values are evaluated and stored as signal profiles in the data memory 3. Through an input unit 4, the signal profiles stored in the data memory 3 can be assigned to the associated object. Alternatively, the assignment of signal profiles to the objects can be carried out through items of information that are supplied through a connected data line 5.

The information about the assignment of object to signal profile is stored as an additional item of information in the data memory 3. Once a large number of signal profiles have been created in the data memory 3, these possible signal profiles can be detected, again, by the evaluation unit 2. If the sensors $1a$, $1b$, $1c$ scan an object and supply the measured values to the evaluation unit 2, the evaluation unit 2 can combine the measured values determined to form a measured value profile and can compare the measured value profile with the signal profiles stored in the data memory 3. If the evaluation unit 2 establishes that there is identity between the measured value profile determined and the stored signal profile, the identification of the object can be indicated on a display 6. If an object is identified, household appliances can then be driven through a control line 7. The household appliances are driven based upon the object identified by the evaluation unit 2. The manner in which object-specific driving is carried out is predefined as a control program in the program memory 8. The control programs can be predefined or can be programmed individually by the user through the input unit 4. The control programs programmed by the input unit 4 are stored in the program memory 8. The evaluation unit 2 is able to call the stored control programs and, based thereupon, to drive the household appliances through the control line 7. A number of household appliances can be driven through the control line 7. It is also possible for a number of evaluation units 2 belonging to different users to be connected to one another through the data line 5.

I claim:

1. A method for identifying at least one object from a number of possible objects, which comprises:
   obtaining measured values of different physical properties of objects with at least one measurement device; and
   dependent upon a number and a type of the objects to be distinguished, evaluating the measured values obtained by determining at least a minimum number of the measured values of the objects to allow identification of at least one of the objects based upon at least one of the physical properties;

registering the current state of the at least one object for later use by the user.

2. The method according to claim 1, which further comprises generating a specific signal profile from a number of measured values for each object to be identified.

3. The method according to claim 2, which further comprises storing the signal profiles in a signal profile memory.

4. The method according to claim 3, which further comprises providing the signal profile memory as an electronic database.

5. The method according to claim 3, which further comprises associating a respective signal profile to a specific possible object based upon an input variable.

6. The method according to claim 5, which further comprises:
linking a number of signal profile memories with one another; and
carrying out an assignment of a signal profile to a possible object in one of the signal profile memories.

7. The method according to claim 2, which further comprises including a location of a measurement in the signal profile.

8. The method according to claim 1, which further comprises providing the measurement device as a sensor that determines physical properties of the objects.

9. The method according to claim 8, which further comprises selecting the physical properties from the group consisting of temperature, weight, humidity, electrical conductivity, thermal conductivity, electrical capacitance, magnetism, reflectance, and at least one of radioactivity and discharge of gas.

10. The method according to claim 8, which further comprises indirectly sensing the physical properties of the objects with the sensors.

11. The method according to claim 10, which further comprises determining the physical properties of the objects through at least one of ultrasound vibration analysis and infrared spectroscopy.

12. The method according to claim 8, which further comprises measuring the objects with the sensors without contact.

13. The method according to claim 8, which further comprises selecting the sensors from the group consisting of a bar code reader, a text reader, and a transponder reader.

14. The method according to claim 8, which further comprises utilizing the physical properties determined by the sensors as an input variable for determining further physical variables that can be determined from the input variables.

15. The method according to claim 1, which further comprises indirectly measuring the physical properties of the objects with the measurement device.

16. The method according to claim 1, which further comprises providing optical sensors as the measurement device and determining at least one of a color, a shape, and a surface structure of the objects with the optical sensors.

17. The method according to claim 16, which further comprises providing at least one of the optical sensors as an image-evaluating camera system.

18. The method according to claim 16, which further comprises operating at least one of the optical sensors utilizing the transmitted light technique.

19. The method according to claim 1, which further comprises measuring the objects without contact.

20. The method according to claim 1, which further comprises configuring the measurement device as at least one sensor selected from the group consisting of a bar code reader, a text reader, and a transponder reader.

21. A device for carrying out the method according to claim 1.

22. The method according to claim 1, further including the step of outputting the identification of the at least one object.

23. A device for identifying at least one object from a number of possible objects, comprising:
at least one measurement device for obtaining measured values of different physical properties of the objects to be measured;
an evaluation assembly connected to said measurement device, said evaluation assembly being programmed to:
receive the measured values from said measurement device;
evaluate the measured values obtained, dependent upon a number and a type of the objects to be distinguished, by determining at least a minimum number of the measured values of the objects to allow identification of at least one of the objects based upon at least one of the physical properties; and
register the current state of the at least one object for later use by the user.

24. The device according to claim 23, wherein:
said evaluation assembly supplies at least one output signal for driving electrical appliances; and
said output signal drives at least one operating function of at least one electrical household appliance.

25. The device according to claim 24, wherein the at least one household appliance is selected from the group consisting of a stove, a cooktop, an extractor hood, a dishwasher, a refrigerator, a freezer, a washing machine, a clothes dryer, a household robot, a floor cleaning appliance, and a vacuum cleaner.

26. The device according to claim 23, wherein said evaluation assembly is additionally programmed to output an identification of the at least one object.

27. In an electrical household appliance, an evaluator comprising:
a device for identifying at least one object from a number of possible objects including:
at least one measurement device for obtaining measured values of different physical properties of the objects to be measured;
an evaluation assembly connected to said measurement device, said assembly being programmed to:
receive the measured values from said measurement device;
evaluate the measured values obtained, dependent upon a number and a type of the objects to be distinguished, by determining at least a minimum number of the measured values of the objects to allow identification of at least one of the objects based upon at least one of the physical properties; and
register the current state of the at least one object for later use by the user.

28. The device according to claim 27, wherein the electrical household appliance is selected from the group consisting of a stove, a cooktop, an extractor hood, a dishwasher, a refrigerator, a freezer, a washing machine, a clothes dryer, a household robot, a floor cleaning appliance, and a vacuum cleaner.

29. The device according to claim 27, wherein said evaluation assembly is additionally programmed to output an identification of said at least one object.

30. A method for identifying at least one object from a number of possible objects, which comprises:
  obtaining measured values of different physical properties of objects with at least one measurement device;
  dependent upon a number and a type of the objects to be distinguished, evaluating the measured values obtained by determining at least a minimum number of the measured values of the objects to allow identification of at least one of the objects based upon at least one of the physical properties; and
  outputting the identification of the at least one object.

31. A method for identifying at least one object from a number of possible objects, which comprises:
  obtaining measured values of different physical properties of objects with at least one measurement device;
  dependent upon a number and a type of the objects to be distinguished, evaluating the measured values obtained by determining at least a minimum number of the measured values of the objects to allow identification of at least one of the objects based upon at least one of the physical properties; and
  storing at least one signal profile in a data memory.

* * * * *